US009766812B2

(12) United States Patent
Pendharkar

(10) Patent No.: US 9,766,812 B2
(45) Date of Patent: Sep. 19, 2017

(54) METHOD AND SYSTEM FOR STORING DATA IN COMPLIANCE WITH A COMPRESSION HANDLING INSTRUCTION

(75) Inventor: Niranjan Pendharkar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 335 days.

(21) Appl. No.: 13/187,168

(22) Filed: Jul. 20, 2011

(65) Prior Publication Data

US 2013/0024432 A1    Jan. 24, 2013

(51) Int. Cl.
*G06F 7/00*    (2006.01)
*G06F 3/06*    (2006.01)
*G06F 17/30*    (2006.01)

(52) U.S. Cl.
CPC ............ *G06F 3/0608* (2013.01); *G06F 3/067* (2013.01); *G06F 3/0638* (2013.01); *G06F 3/0659* (2013.01); *G06F 17/30147* (2013.01); *G06F 17/30153* (2013.01)

(58) Field of Classification Search
None
See application file for complete search history.

(56) References Cited

U.S. PATENT DOCUMENTS

| 6,009,242 | A | * | 12/1999 | Anzai | 358/1.15 |
| 6,137,587 | A | * | 10/2000 | Muto | G06F 3/1293 358/1.15 |
| 6,189,046 | B1 | * | 2/2001 | Moore | G06F 17/243 709/217 |
| 7,496,586 | B1 | * | 2/2009 | Bonwick et al. | |
| 7,937,550 | B2 | * | 5/2011 | Morita | G11B 20/00007 707/693 |
| 2004/0148303 | A1 | * | 7/2004 | McKay | G06F 17/30345 |
| 2005/0192994 | A1 | * | 9/2005 | Caldwell | G06F 17/30286 |
| 2005/0198395 | A1 | * | 9/2005 | Verma | G06F 17/30902 709/247 |
| 2009/0106281 | A1 | * | 4/2009 | Marwah | G06F 17/30377 |
| 2009/0216788 | A1 | * | 8/2009 | Rao | G06F 17/30233 |
| 2009/0254513 | A1 | * | 10/2009 | Luukkala | G06F 17/30153 |
| 2011/0231485 | A1 | * | 9/2011 | Shalev | H03M 7/30 709/203 |

* cited by examiner

*Primary Examiner* — Hasanul Mobin
(74) *Attorney, Agent, or Firm* — Wilmer Cutler Pickering Hale and Dorr LLP

(57) ABSTRACT

A method for storing data in a storage system. In one embodiment, implementation of a method for storing data in compliance with a compression handling instruction includes: at a storage controller, receiving an object for storage within a data storage, wherein the object is in an original state; determining whether a compression handling instruction is received in association with the object; and executing the compression handling instruction when storing the object.

20 Claims, 8 Drawing Sheets

METHOD AND SYSTEM FOR STORING DATA IN COMPLIANCE WITH A COMPRESSION HANDLING INSTRUCTION

BACKGROUND

Data storage systems are repositories for storing large quantities of data. For instance, many commercial databases and applications store their data in these data storage systems, such as, a disk array system containing multiple physical disk drives. The disk array system is logically separated into many units used for storing data.

To maximize the use of the data storage system, data is first compressed by the data storage system, independently of the application storing the data. That is, the compression is performed without regard to the type or importance of the data being stored. In some cases, the data may be compressed as much as fifty percent, thereby doubling the capacity of the data storage system. As such, instead of storing data in its original form, the data is first compressed using any number of compression algorithms, and then stored in its compressed form. Upon retrieval of the data, a decompression algorithm procedure is performed to return the data into its original form that is recognized by the requestor and/or application storing the data.

There are certain conditions in which the data need not be compressed. However, the data storage system is unable to recognize these conditions, and by default runs that requested data through compression before it is stored. For example, a file may be already compressed by the application requesting storage of the file. Though the file has been compressed upon submission for storing, the data storage system automatically performs its own compression procedure on the file, thereby further compressing the file even further. Many times, performing additional compression actually increases the size of the file, which actually goes away from the objective of compressing the submitted data to maximize the usage of the storage system. In addition, performing multiple compression processes on the file may actually corrupt the file to the point that the information contained in the file is permanently damaged.

In other cases, the data being stored may require high performance levels when storing and accessing that data within the data storage system. For instance, the application storing the data may require real time performance in terms of storing and accessing the data to and from the data storage system. As an example, an application monitoring the movements of the various financial markets depending on the trades made by one or more of its clients requires real time use of its information. However, performance of the application suffers when the data storage system interlaces a default compression step when storing data, and then a necessary decompression step when accessing and delivering the data.

SUMMARY

Systems and methods of storing data into a data storage in compliance with a compression handling instruction are presented. Instead of immediately compressing the data before storing into the data storage, the data is stored in compliance with a compression handling instruction provided with the data (e.g., an in-band operation), or provided in association with the data (e.g., an out-of-band operation). In one embodiment, computer implementation of a method for storing data in compliance with the compression handling instruction includes: at a storage controller, receiving an object for storage within a data storage, wherein the object is in an original state; determining whether a compression handling instruction is received in association with the object; and executing the compression handling instruction when storing the object.

In one embodiment, an in-band storing process includes discovering that the compression handling instruction is received along with the request for storing the object into the data storage, such that the instruction indicates the object is not to be compressed. As such, the object is stored in its original state (e.g., without performing any compression) into the data storage. In one embodiment, instead of compressing the object in the normal process, the default compression procedure is disabled when storing the object. In addition, a compression handling flag is set, wherein the flag indicates the object is not to be decompressed from its stored state when later accessed. The flag and the object in its original state are stored in association into the data storage.

In another embodiment, an out-of-band storing process includes determining that the compression handling instruction was not received with the object, or was originally received but held in reservation till a later time for execution; from its original state, compressing the object into a compressed state; storing the object in the compressed state into the data storage; receiving the compression handling instruction separate from the object (or received with the object but held in reservation), such that the instruction indicates the object is not to be compressed; accessing the object in its compressed state; decompressing the object into an uncompressed state; setting a compression handling flag, wherein the flag indicates the object is not to be decompressed when accessed; and storing the object in the uncompressed state in the data storage.

In still another embodiment, it is determined that the compression handling instruction was received, wherein the instruction provides that the object should be compressed before storing into the data storage. As such, the object is compressed from its original state to a compressed state. The object is stored in its compressed state into the data storage.

In one embodiment, a computer system comprises a processor coupled to memory having stored therein instructions that, if executed by the computer system, cause the computer to execute a method for storing data, comprising: receiving an object for storage within a data storage, wherein the object is in an original state; determining whether a compression handling instruction is received in association with the object; and executing the compression handling instruction when storing the object.

An in-band storing method as executed by the computer system includes discovering the compression handling instruction was received along with the request for storing the object into the data storage, such that the instruction indicates the object is not to be compressed. As such, the object is stored in its original state (e.g., without performing any compression) into the data storage. In one embodiment, a compression handling flag is set, wherein the flag indicates the object is not to be decompressed from its stored state when later accessed. The flag and the object in its original state are stored in association into the data storage.

An out-of-band storing method as executed by the computer system includes determining that the compression handling instruction was not received with the object; from its original state, compressing the object into a compressed state; storing the object in the compressed state into the data storage; receiving the compression handling instruction separate from the object, such that the instruction indicates the object is not to be compressed; accessing the object in its compressed state; decompressing the object into an uncompressed state; setting a compression handling flag, wherein the flag indicates the object is not to be decompressed when accessed; and storing the object in the uncompressed state in the data storage.

A request to access the object from a requesting device as received is executed by the computer system by accessing the object and determining the presence of a compression handling flag. When there is a flag, the object is delivered to the requesting device without decompressing the object. On the other hand, the object is delivered to the requesting device after compressing the object when there is no compression handling flag stored in association with the object.

A computer implemented method for storing data into a data storage system includes at a storage controller, receiving an object for storage within a data storage, wherein the object is in an original state; determining whether a compression handling instruction is received in association with the object; and executing the compression handling instruction when storing the object. When a compression handling instruction is received indicating the object should not be compressed, the object is stored in its original state into the data storage. On the other hand, when a compression handling instruction is received indicating the object should be compressed, the object is first compressed to a compressed state before storing the object into the data storage.

Thus, according to embodiments of the present disclosure, a compression handling instruction is checked to determine if the data should or should not compressed when storing data into a data storage system that normally compresses all data before storing. As such, methods and systems for storing data in compliance with compression handling instructions are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
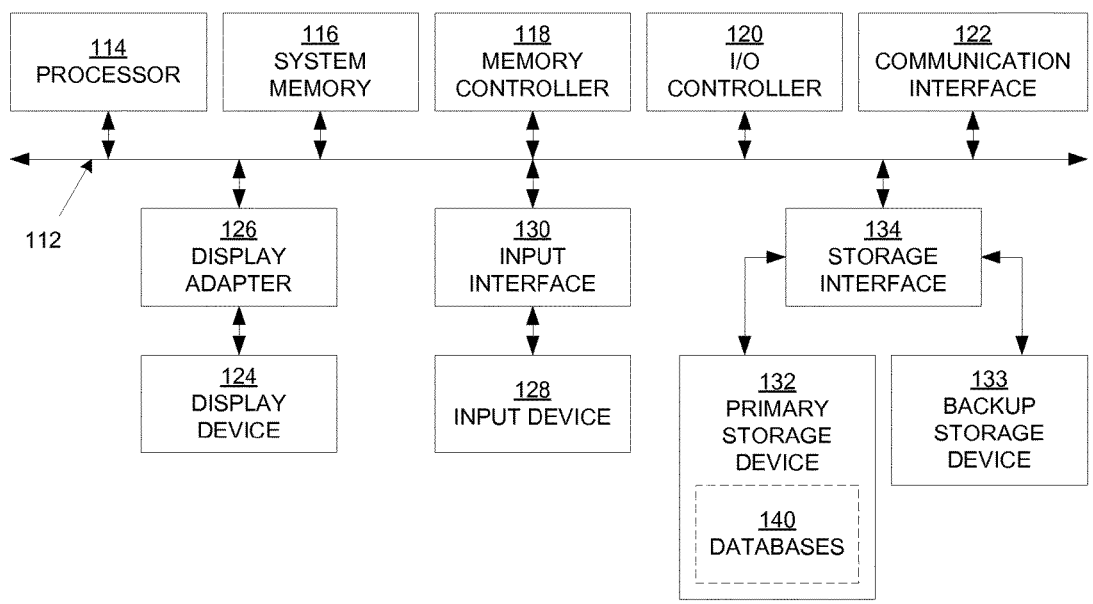
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "determining," "executing," "storing," "delivering," "disabling," or the like, refer to actions and processes (e.g., flow charts 400, 600, 700, and 800 of FIGS. 4, 6, 7, and 8, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
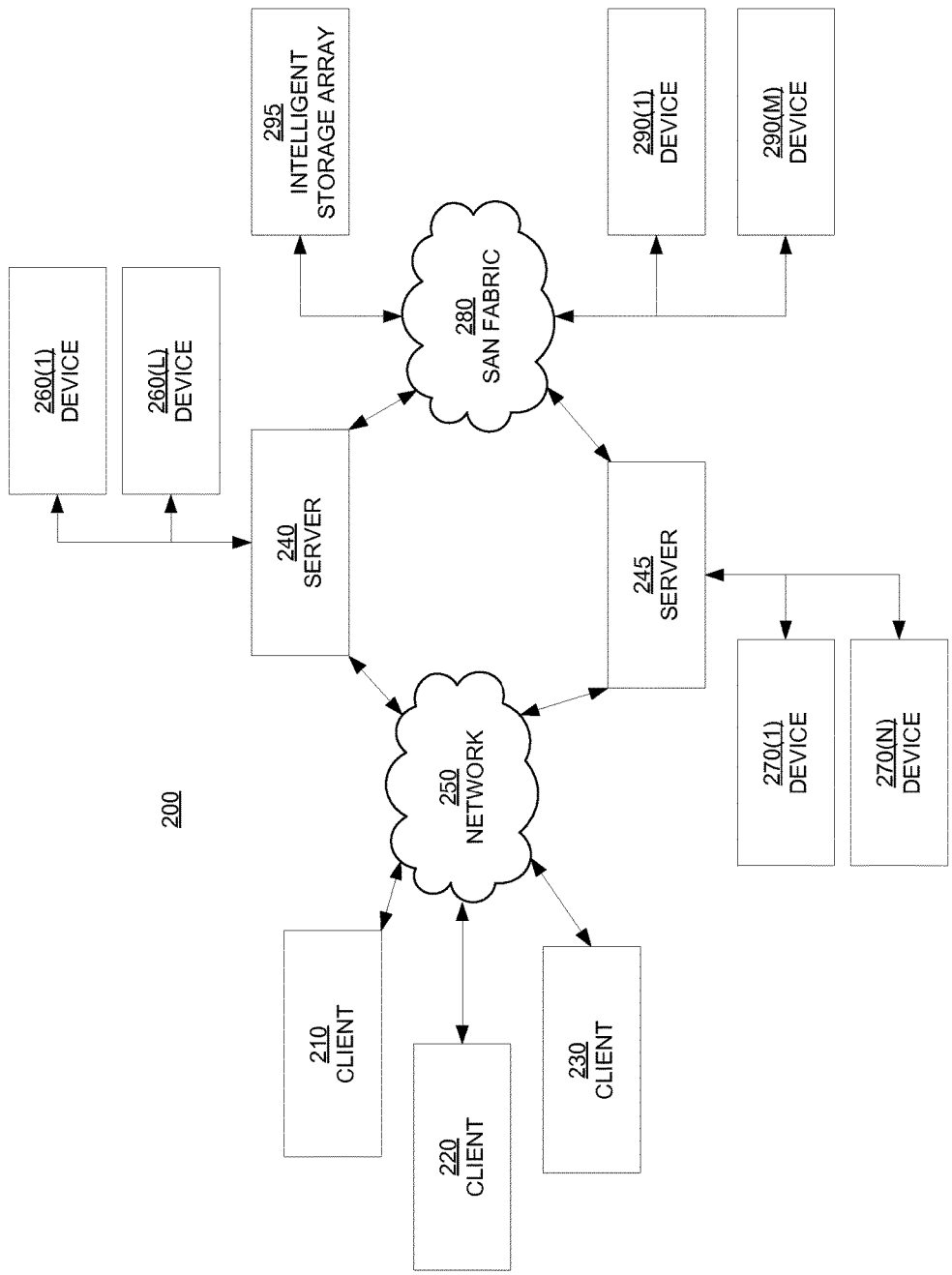
FIG. 2 is a block diagram depicting a network architecture in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290 (1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate the implementation of a compression handling instruction when storing data into a data storage system. In that manner, instead of performing the default procedure of compressing all data before storing data, certain data is handled differently as directed by the compression handling instruction. As such, data that has already been compressed is not further compressed, thereby reducing the chance that the data may be lost or changed to a format that is of a larger size. In addition, special compression handling instructions may be provided for critical data which bypass the normal compression/decompression processes used when storing and accessing the data, thereby providing fast storing and accessing times of data and increasing the performance of the application utilizing that data.

Embodiments of the present disclosure are described within the context of a data storage system, such as a disk array that provides storage for various applications, including, a host application or a file storage application, such as, a network file system (NFS), network attached storage (NAS), storage area networks (SANs), etc. However, embodiments of the present disclosure can be implemented within any environment storing data in order to differentiate different types of data being stored, and different priorities of data. For example, the environment may include any commercial data storage system, an interoffice or office data storage system, a personal data storage system (e.g., a computer), a multi-media file storage repository, archives, storage as a service (SaS), etc. In that manner, special compression handling instructions provided in association with certain data are able to increase the storing efficiency of the data storage system by avoiding compressing data that has already been compressed, and is able to provide increased performance of the storage system through quicker storing and accessing times.

Figure 3:
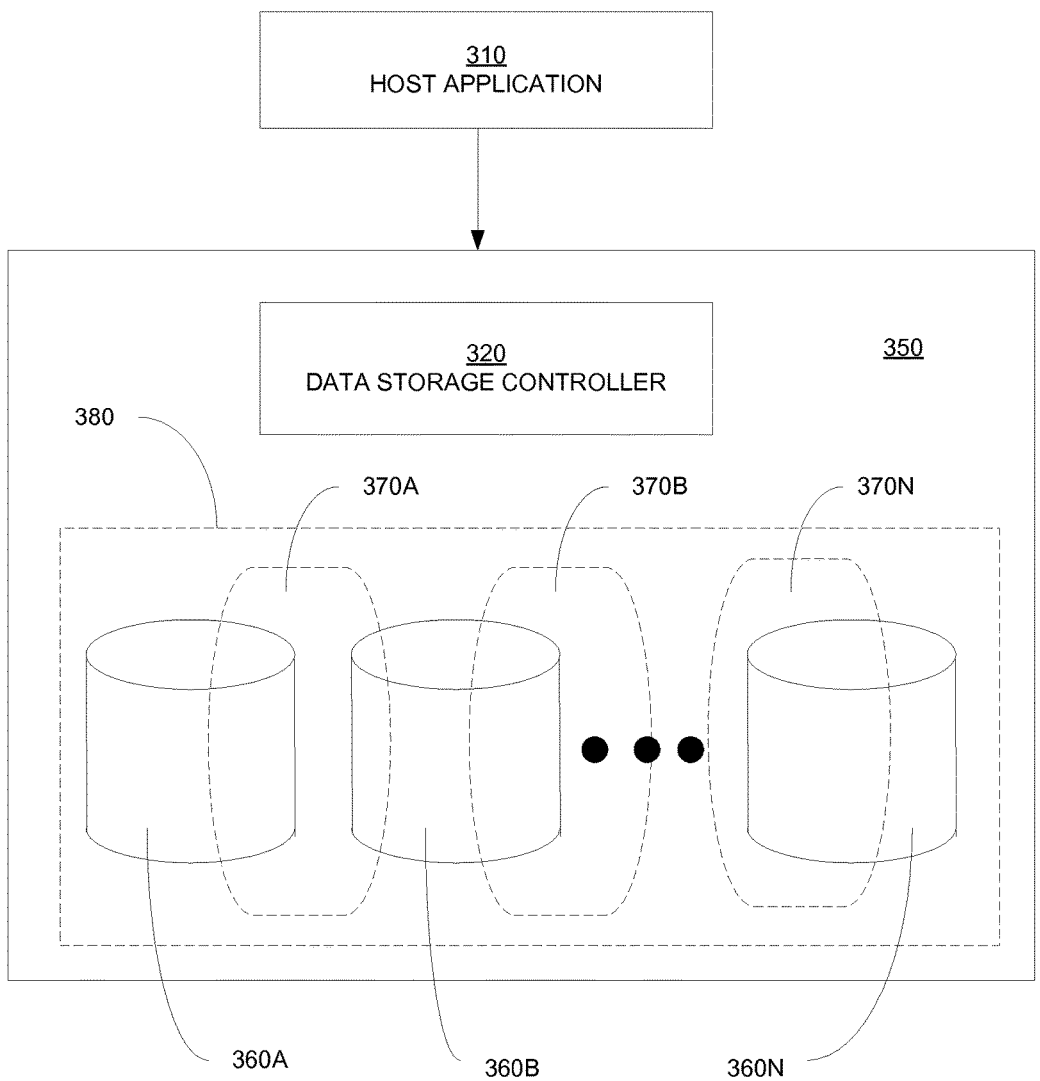
FIG. 3 is a block diagram illustrating a system configured to store data in compliance with a compression handling instruction, in accordance with one embodiment of the present disclosure.

FIG. 3 is a block diagram illustrating a file storage system 300 configured to store data in compliance with a compression handling instruction, in accordance with one embodiment of the present disclosure. The file storage system 300 is configured to store data in compliance with a compression handling instruction that is provided in association with the data being stored.

As shown in FIG. 3, system 300 includes a host application 310 that is accessing the data storage system 350 for purposes of storing data. For instance, the host application 310 may be a file storage system (e.g., SAN, NAS, NFS, etc.) or any commercial file storage system. The file storage system 350, as managed by the host application 310, may support a large enterprise that includes many individuals (e.g., company, corporation, etc.), and provides for storing and organizing computer information, files and their data, for example within the storage devices of FIG. 2. At a high level, the host application 310 managing the file storage system 350 organizes files, information, data (generally referred to as "objects" throughout the application) into a database for storage, organization, manipulation and retrieval by one or more requesting computing systems.

In other embodiments, and as previously described, host application 310 may include a stand-alone application that is accessing the data storage system 350 for purposes of storing data. For instance, the host application 310 may be a media repository or an archiver system.

As shown in FIG. 3, the host application 310 stores data into the data storage system 350. For illustration, data storage system 350 includes a disk array 380 that includes one or more physical disk drives 360 A-N, but may be comprised of any physical storage configuration capable of storing data. The data storage system is able to distribute its storage capacity throughout a plurality of virtual partitions or disks, such as, logical unit numbers (LUNs). Associated data may be spread across the physical disk drives 360 A-N, and duplicated to avoid loss of data when the data storage system is suffering from failure of one or more of its physical disk drives.

In particular, the data storage controller 320 performs the operations necessary for storing data onto the physical portions of the disk. That is, the storage controller communicates with and manages the physical disk drives. As such, the storage controller 320 is able to present various virtual storage configurations to the host application 310 for storing data. In one embodiment, the data storage controller 320 is directed by the host application 310 with regards to storing data onto the disk array, such as, in a commercial data storage system, while in other embodiments, the data storage controller 320 acts independently of the host application in terms of storing data into the disk array.

In particular, the data storage controller 320 is configured to compress data before storing it on to the disk array 380 of the data storage system 350. Typically, the compression process is performed automatically before storing any data onto the disk array 380, or more generally into the data storage system 350. However, in embodiments of the present disclosure storage controller 320 is able to intelligently manage the compression of incoming data to determine when to compress the data, and when not to compress the data for purposes of increasing the efficiency as well as increasing the performance of the data storage system 350.

Figure 4:
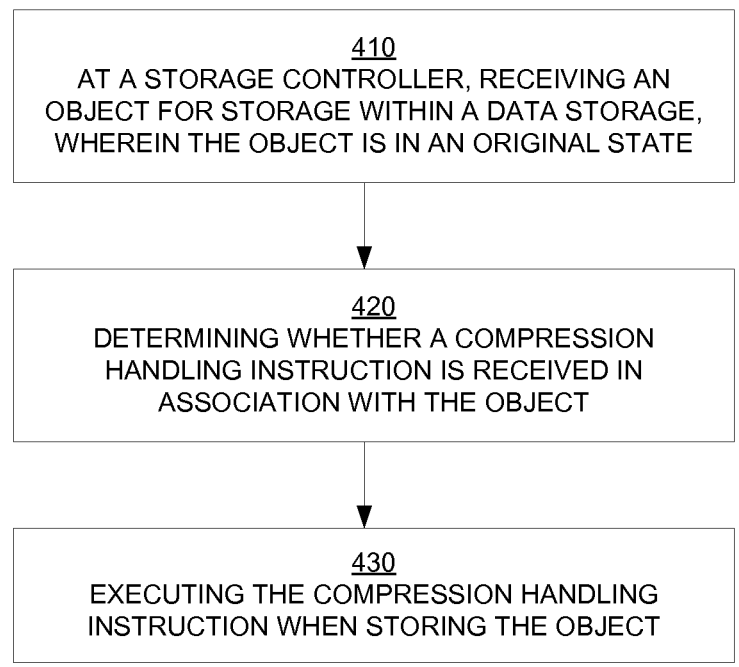
FIG. 4 is a flow chart of a computer-implemented process for storing data in a data storage system in compliance with a compression handling instruction, in accordance with one embodiment of the present disclosure.

FIG. 4 is a flow chart 400 of a computer-implemented process for storing data in a data storage system in compliance with a compression handling instruction, in accordance with one embodiment of the present disclosure. For instance, the operations performed by flow chart 400 can be implemented within the data storage controller 320 when storing data into the data storage system 350 of FIG. 3, and/or the compression system 500 of FIG. 5.

In block 410, an object is received at a data storage controller. The object is representative of any form of data or information capable of being manipulated by a computing system. For example, the object may be a file containing information. The object is received for storage within a data storage system, such as, a disk array previously described.

Further, the object is received in an original state. In particular, the state of the object is in reference to whether any compression has been performed by the data storage system when internally storing that data. The object is typically in a state that is recognizable and usable by the host application requesting storage of that object, and/or the originating application requesting storage of the object. In one case, the original state of the object may already be in a pre-compressed format (e.g., a portable document format (PDF) format). In another case, the original state of the object is not in any compressed format.

In block 420, it is determined whether a compression handling instruction is received in association with the object. In particular, the host application is able to recognize the format of the object, or determine a handling priority of the object, and make a determination on whether the underlying data storage system should compress that object, or pass that object through without performing any compression before storage. That instruction is delivered to the data storage system in the form of a compression handling instruction.

In block 430, if there is a compression handling instruction, then that instruction is executed before storing the object into the data storage system. In one embodiment, the instruction is provided and indicates that the object should not be compressed prior to storing in the data storage system. That is, the object should be stored in its original state, as received by the data storage system. In another embodiment, the instruction is provided and indicates that the object should be compressed prior to storing in the data storage system. That is, the object should be stored in a compressed state.

Figure 5:
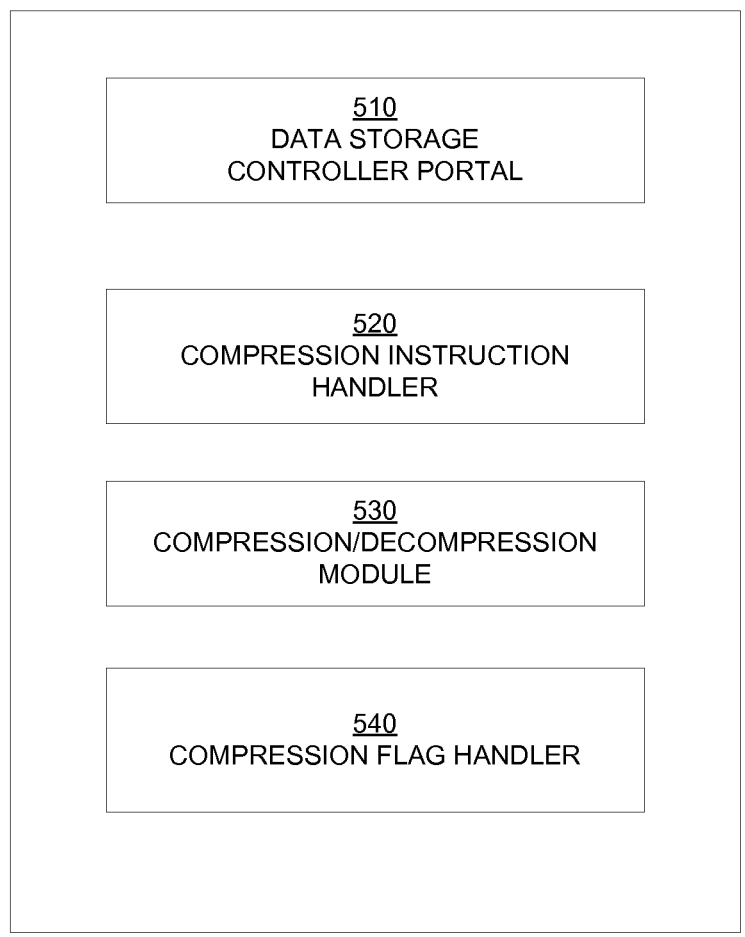
FIG. 5 is a block diagram illustrating a compression system configured to store data in compliance with a compression handling instruction, in accordance with one embodiment of the present disclosure.

FIG. 5 is a block diagram illustrating a compression system 500 configured to store data in compliance with a compression handling instruction, in accordance with one embodiment of the present disclosure. The compression system 500 may be implemented by the data storage controller 320 of FIG. 3 when determining whether an object should or should not be compressed when storing it into the data storage system. In addition, the compression system may implement the operations outlined in the flow charts 400, 600, 700, and 800 of FIGS. 4, 6, 7, and 8, respectively.

As shown in FIG. 5, the compression system 500 includes a data storage controller portal 510. The portal 510 provides access into the underlying storage system. For instance, the portal is accessed when an object is being stored into the data storage system, and when an object is accessed from the data storage system, in order to determine whether the object should be compressed upon storage, and/or decompressed when accessed from storage.

In particular the compression system 500 includes compression instruction handler 520. When storing an object into the data storage system, the handler 520 is able to determine whether a compression instruction is provided in association with the object indicating whether the object should or should not be compressed prior to storing it in the data storage system. The instruction overrides any default process of automatically compressing data before storing into the data storage system.

In addition, the compression instruction handler 520 is able to determine whether an object being accessed is associated with special compression handling instructions, such as, when the object was originally stored into the data storage system. For instance, the handler 520 is able to determine whether the object stored in the data storage system was not compressed prior to storage in the data storage system. Typically, data is compressed before storage by the data storage system, and in the default process is decompressed upon access. In particular, the compression system 500 includes a compression flag handler 540. Specifically, whenever an object is stored into the data storage system without first compressing that object, a compression flag is set and stored in association with the object. As such, the presence of the flag indicates that the object when accessed should not be decompressed. As such, the flag handler 540 is able to determine that an accessed object should not be decompressed whenever a compression flag is present, as it was not originally compressed upon storage.

Figure 6:
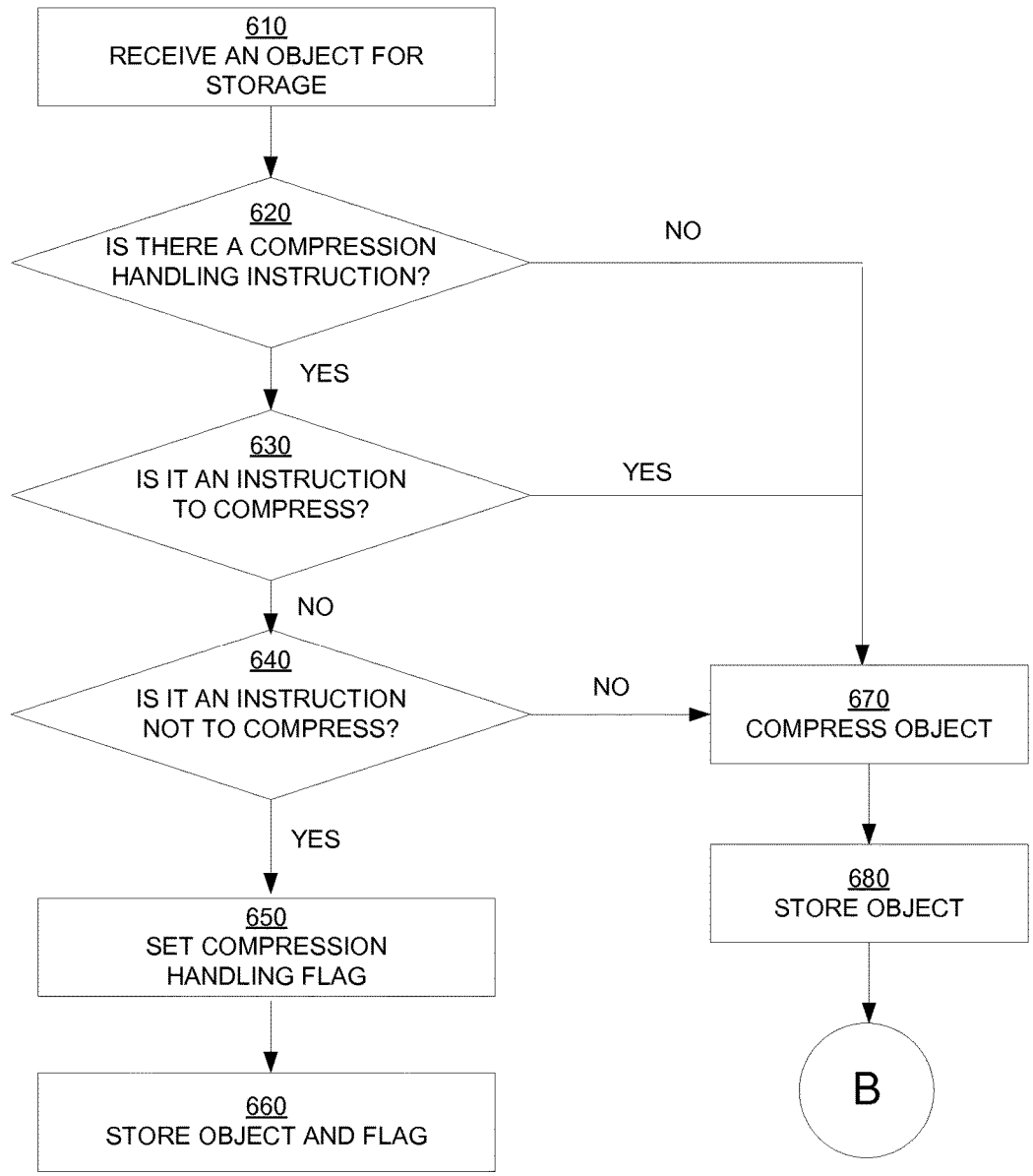
FIG. 6 is a flow chart of a computer-implemented process for in-band storing of data in a data storage system in compliance with an in-band compression handling instruction, in accordance with one embodiment of the present disclosure

FIG. 6 is a flow chart of a computer-implemented process for in-band storing of data in a data storage system in compliance with an in-band compression handling instruction, in accordance with one embodiment of the present disclosure. For instance, in one embodiment, the process outlined in flow chart 600 is implemented by the data storage controller 320 of FIG. 3, and/or the compression system 500 of FIG. 5 for storing objects in compliance with compression handling instructions.

At block 610, an object is received for storage within a data storage system, such as, a disk array. In one implementation, the object is received by a storage controller. For instance, the storage controller manages the storing and manipulation of data within a disk array system. More particularly, the object is received in an original state. That is, the object, as requested by an application for storage, is associated with a state of compression as performed by some entity outside of the data storage system. As such, the data storage system may perform compression, or elect not to perform compression on the object, in accordance with embodiments of the present disclosure.

At decision block 620, it is determined whether a compression handling instruction is received along with the object. In the in-band storing of data, the delivery of a compression handling instruction occurs along with the associated object upon requesting storing that object within the data storage system. The instruction is provided by the application (e.g., host application, file system manager, stand-alone application, etc.) requesting the storing of the object into the data storage system. The application is in the best position to determine what compression handling instruction should be provided in association with the object.

At decision block 620, if no handling instruction is received, then the data storage system implements its normal procedure for storing data. In particular, the object is first compressed without regard to its original compression state in block 670. Thereafter, the object is stored in a compressed state into the data storage system in block 680. Later, a compression handling instruction may be received in an out-of-band operations, as further outlined in the method of flow chart 700 of FIG. 7 as accessed through point "B".

On the other hand, if a compression handling instruction is received, then the method outlined in flow chart 600 proceeds to decision block 630, where it is determined if the instruction is an instruction to compress. If the compression handling instruction indicates or instructs the data storage system to compress the object before storing into the data storage system, then the method proceeds to block 670, in which the object, in its original state, is compressed prior to storage within the data storage system in block 680. Again, an out-of-band compression handling instruction may be implemented through flow chart 700 of FIG. 7, as accessed through point "B" in FIG. 6.

On the other hand, if the instruction does not instruct the data storage system to compress the data, then the method outlined in flow chart 600 proceeds to decision block 640, where it is determined if the instruction is an instruction to not compress the data. If the instruction does not provide any instruction to not compress the object, then the method defaults back to its original compression process and proceeds to block 670, in which the object, in its original state, is compressed prior to storage within the data storage system in block 680. Again, an out-of-band compression handling instruction may be implemented through flow chart 700 of FIG. 7, as accessed through point "B" in FIG. 6.

However, in another instance, the compression handling instruction instructs the data storage system to not compress the data before storing into the data storage system, in which case the method outlined in flow chart 600 proceeds to block 650. As such, the object is stored in its original state as received. This may require, in one implementation the disabling of the default compression procedure, at least with respect to the storing of this object, as normally implemented by the data storage system. For instance, the object may already be compressed, and further compression might negatively impact the integrity of the information contained within the data, or may provide no additional disk space savings. Also, the object may be of such a sensitive format that the object is not capable of being compressed, for fear of loss of information. In addition, the object may be of a high priority, such that though it is a format that is compressible for disk savings, other considerations require that object to remain uncompressed for quick storing and accessing of the object from the data storage system. That is, the object should not be compressed upon storage so that access performance of the data through the data storage system is correspondingly high, such that the data storage system is able to quickly store and access the object.

At block 650, a compression handling flag is set, wherein the flag indicates the object is not to be decompressed from its stored state when accessed. In this particular case, the object is stored in its original state, given the compression handling instruction not to compress. In addition, at block 660, the compression handling flag and the object are associatively stored into the data storage system. As such, rather than following the normal process of decompressing objects being accessed, the data storage system does not decompress the object upon any future access of the object.

Figure 7:
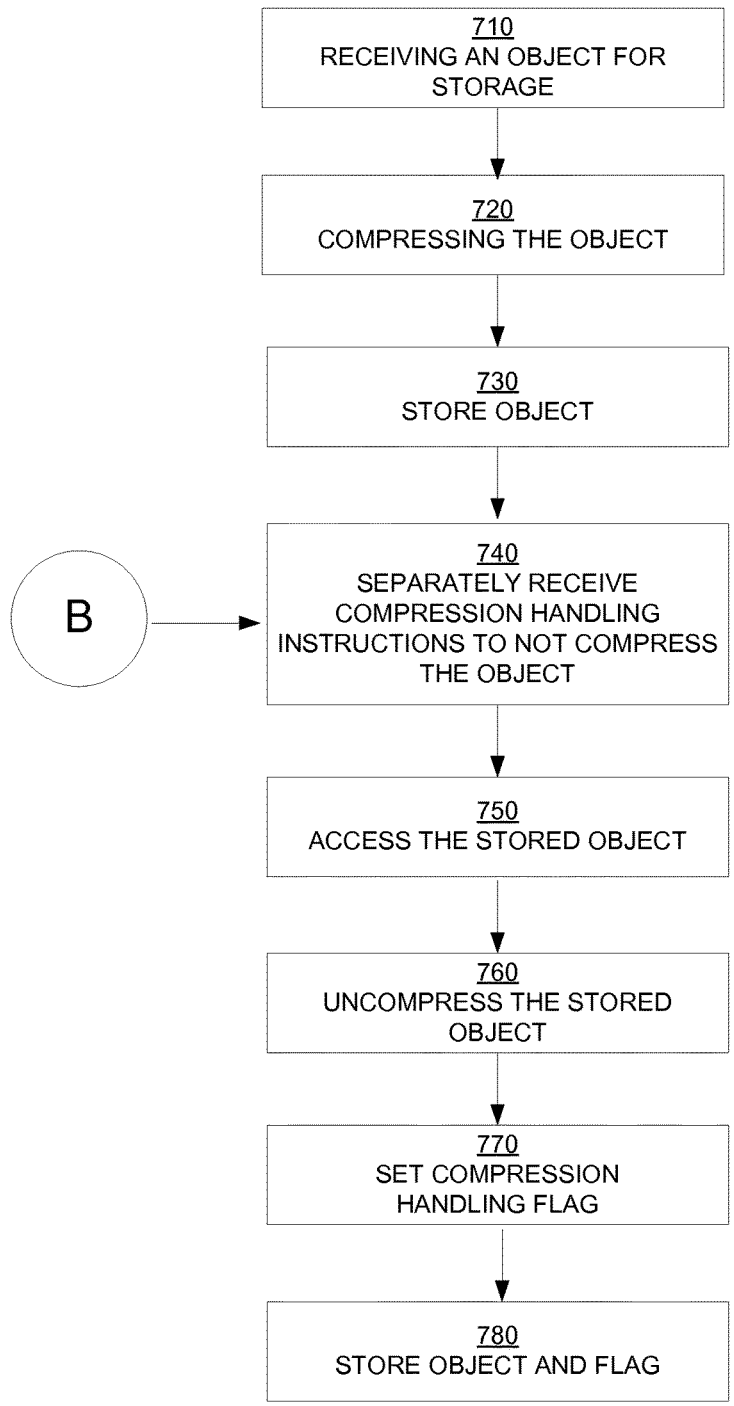
FIG. 7 is a flow chart of a computer-implemented process for out-of-band storing of data in a data storage system in compliance with an out-of-band compression handling instruction, in accordance with one embodiment of the present disclosure

FIG. 7 is a flow chart of a computer-implemented process for out-of-band storing of data in a data storage system in compliance with an out-of-band compression handling instruction, in accordance with one embodiment of the present disclosure. For instance, in one embodiment, the process outlined in flow chart 700 is implemented by the data storage controller 320 of FIG. 3, and/or the compression system 500 of FIG. 5 for storing objects in compliance with compression handling instructions.

At block 710, an object is received for storage within a data storage system, such as, a disk array. In one implementation, the object is received by a storage controller. For instance, the storage controller manages the storing and manipulation of data within a disk array system. More particularly, the object is received in an original state. That is, the object, as requested by an application for storage, is associated with a state of compression as performed by some entity outside of the data storage system.

At block 720, the data storage system implements its normal procedure for storing data. In particular, the object is first compressed without regard to its original compression state. Thereafter, the object is stored in a compressed state into the data storage system in block 680.

At block 740, a compression handling instruction is separately received. The operations at block 740 may be reached from block 730, or alternatively through point "B" from flow chart 600 of FIG. 6. In the out-of-band storing of data, the delivery of a compression handling instruction occurs separately from the associated object. That is, the compression handling instruction may be received after the request is received for storing the object within the data storage system. The instruction is provided by the application (e.g., host application, file system manager, stand-alone application, etc.) requesting the storing of the object into the data storage system. The application is in the best position to determine what compression handling instruction should be provided in association with the object.

Further, the compression handling instruction may have been previously received in an in-band operation, but reserved for later implementation. In that case, the object is treated in the normal process for storing, and as such is compressed and stored in an original received state. The compression handling instruction is later retrieved in block 740, such as, when the data storage system is implementing a bulk process for compressing object previously recited over a period.

The compression handling instruction indicates and instructs the data storage system to not compress the data. For instance, the object may already be compressed, and further compression might negatively impact the integrity of the information contained within the data, or may provide no additional disk space savings. Also, the object may be of such a sensitive format that the object is not capable of being compressed, for fear of loss of information. In addition, the object may be of a high priority, such that though it is a format that is compressible for disk savings, other considerations require that object to remain uncompressed for quick storing and accessing of the object from the data storage system.

Because the object is already stored in a compressed format, at block 750, the object, now compressed from its original state, is accessed. Since the instruction indicates the object is not to be compressed, the object is now decompressed at block 760. This situation may arise when the data storage system is not configurable to accept in-band instructions, or when the compression handling instruction is held in reservation until a later time.

At block 770, a compression handling flag is set, wherein the flag indicates the object is not to be decompressed from its stored state when accessed. In this particular case, the object is stored in an uncompressed state (having been first compressed first from an original received state). In addition, at block 780, the compression handling flag and the object are associatively stored into the data storage system. As such, rather than following the normal process of decompressing objects being accessed, the data storage system does not decompress the object upon any future access of the object.

Figure 8:
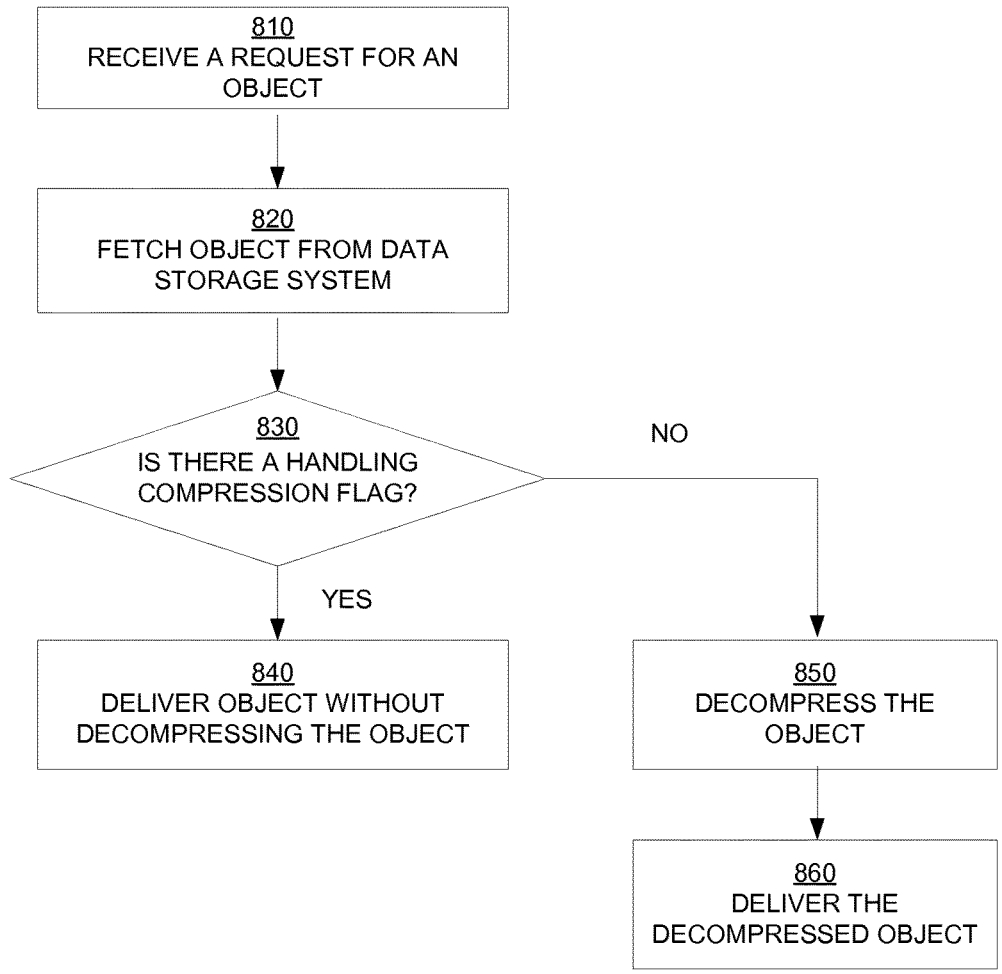
FIG. 8 is a flow chart of a computer-implemented process for accessing and delivering data in compliance with a compression handling instruction, in accordance with one embodiment of the present disclosure.

FIG. 8 is a flow chart of a computer-implemented process for accessing and delivering data in compliance with a compression handling instruction, in accordance with one embodiment of the present disclosure. For instance, in one embodiment, the process outlined in flow chart 800 is implemented by the data storage controller 320 of FIG. 3, and/or the compression system 500 of FIG. 5 for storing and accessing objects in compliance with compression handling instructions.

At block 810, a request for an object is received. In particular, access of the object is requested so that the object may be manipulated. For instance, the request may be received at the storage controller of the data storage system from the host application, and/or from a requesting device. In one implementation, the host application is the requesting device.

At block 820, the object is accessed or fetched from the data storage system. However, before delivering the object, since the data storage system is configured to store objects in compliance with compression handling instruction, at decision block 830, it is determined whether a compression handling flag has been previously set and stored in association with the object (e.g., flag set operations at blocks 650, 660, 770, and 780 of FIGS. 6 and 7.

If no compression handling flag has been set in association with the requested object, then the method of flow chart 800 proceeds to block 850, in which the object is decompressed from its stored state and delivered to the requesting device in block 860.

On the other hand, if a compression handling flag has been set in association with the requested object, then the present embodiment determines that the flag is present and at block 840 the object is delivered to the requesting device without decompressing the object from its stored state.

Thus, according to embodiments of the present disclosure, a data storage system is configurable to store data in compliance with compression handling instructions as disclosed in methods and systems for storing data. In that manner, the data storage system is able to determine whether an object should not be compressed prior to storing in a data storage system in compliance with a compression handling instruction, flag that object as not being compressed by the data storage system, and later deliver the object in its stored state without performing any decompression.

While the foregoing disclosure sets forth various embodiments using specific block diagrams, flow charts, and examples, each block diagram component, flow chart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having computer-executable instructions for causing a computer system to perform a method for storing comprising:
   at a storage controller, receiving from a host application an object for storage within a data storage, wherein said object is a file containing information manipulated by the host application, and wherein said object is in an original state;
   determining whether a compression handling instruction is received in association with said object, wherein said compression handling instruction is an instruction provided to the storage controller by the host application requesting storage of said object, wherein said compression handling instruction indicates either that said object should be compressed or should not be compressed based upon whether compressing said object would affect access performance to said object, wherein the host application determines a type of compression handling instruction to be provided to the storage controller in association with said object, and wherein said compression handling instruction overrides a default process of compressing objects before storing within the data storage; and executing said compression handling instruction when storing said object.

2. The non-transitory computer-readable storage medium of claim 1, wherein in said method said determining whether a compression handling instruction is received comprises:

determining said compression handling instruction was received, such that said instruction indicates said object is not to be compressed; and wherein said executing said compression handling instruction comprises storing said object in its original state into said data storage.

3. The non-transitory computer-readable storage medium of claim 2, further comprising:

disabling a default compression procedure when storing said object into said data storage.

4. The non-transitory computer-readable storage medium of claim 2, further comprising:

setting a compression handling flag, wherein said flag indicates said object is not to be decompressed from its stored state when accessed; and storing said flag in association with said object.

5. The non-transitory computer-readable storage medium of claim 4, further comprising:

receiving a request to access said object from a requesting device at said storage controller;

accessing said object;

determining the presence of said compression handling flag; and delivering said object to said requesting device without decompressing said object from its stored state when said flag is present.

6. The non-transitory computer-readable storage medium of claim 1, further comprising:

determining that said compression handling instruction was not received with said object;

from its original state, compressing said object into a compressed state;

storing said object in said compressed state into said data storage;

receiving said compression handling instruction separate from said object, such that said instruction indicates said object is not to be compressed;

accessing said object in its compressed state;

decompressing said object into an uncompressed state;

setting a compression handling flag, wherein said flag indicates said object is not to be decompressed when accessed; and storing said object in said uncompressed state in said data storage.

7. The non-transitory computer-readable storage medium of claim 1, further comprising:

wherein said determining whether a compression handling instruction is received comprises determining that said compression handling instruction was received, such that said instruction indicates that said object is to be compressed; and wherein said executing said compression handling instruction comprises:

compressing said object into a compressed state; and storing said object in said compressed state into said data storage.

8. The non-transitory computer-readable storage medium of claim 1, further comprising:

storing said object in a data array.

9. A storage controller comprising:

a processor; and memory coupled to said processor and having stored therein instructions that, if executed by said computer system, cause said computer system to execute a method for storing comprising:

receiving from a host application at the storage controller an object for storage within a data storage, wherein said object is a file containing information manipulated by the host application, and wherein said object is in an original state;

determining whether a compression handling instruction is received in association with said object, wherein said compression handling instruction is an instruction provided to the storage controller by the host application requesting storage of said object, wherein said compression handling instruction indicates either that said object should be compressed or should not be compressed based upon whether compressing said object would affect access performance to said object, wherein the host application determines a type of compression handling instruction to be provided to the storage controller in association with said object, and wherein said compression handling instruction overrides a default process of compressing objects before storing within the data storage; and executing said compression handling instruction when storing said object.

10. The storage controller of claim 9, wherein in said method said determining whether a compression handling instruction is received comprises:

determining said compression handling instruction was received, such that said instruction indicates said object is not to be compressed; and wherein said executing said compression handling instruction comprises storing said object in its original state into said data storage.

11. The storage controller of claim 10, wherein said method further comprises:

setting a compression handling flag, wherein said flag indicates said object is not to be decompressed when accessed; and storing said flag in association with said object.

12. The storage controller of claim 11, wherein said method further comprises:

receiving a request to access said object from a requesting device;

accessing said object;

determining the presence of said compression handling flag; and delivering said object to said requesting device without decompressing said object when said flag is present.

13. The storage controller of claim 9, wherein said method further comprises:

determining that said compression handling instruction was not received with said object;

compressing said object into a compressed state;

storing said object in said compressed state into said data storage;

receiving said compression handling instruction separate from said object, such that said instruction indicates said object is not to be compressed;

accessing said object in its compressed state;

decompressing said object into an uncompressed state;

setting a compression handling flag, wherein said flag indicates said object is not to be decompressed when accessed; and storing said object in said uncompressed state in said data storage.

14. The storage controller of claim 9, wherein said method further comprises:

wherein said determining whether a compression handling instruction is received comprises determining that said compression handling instruction was received, such that said instruction indicates said object is to be compressed; and wherein said executing said compression handling instruction comprises:

compressing said object into a compressed state; and storing said object in said compressed state into said data storage.

15. The storage controller of claim 9, wherein said method further comprises:

storing said object in a network-attached storage (NAS) device.

16. A computer implemented method comprising:

at a storage controller, receiving from a host application an object for storage within a data storage, wherein said object is a file containing information manipulated by the host application, and wherein said object is in an original state;

determining whether a compression handling instruction is received in association with said object, wherein said compression handling instruction is an instruction provided to the storage controller by the host application requesting storage of said object, wherein said compression handling instruction indicates either that said object should be compressed or should not be compressed based upon whether compressing said object would affect access performance to said object, wherein the host application determines a type of compression handling instruction to be provided to the storage controller in association with said object, and wherein said compression handling instruction overrides a default process of compressing objects before storing within the data storage; and executing said compression handling instruction when storing said object.

17. The computer implemented method of claim 16, wherein said determining whether a compression handling instruction is received comprises:

determining said compression handling instruction was received, such that said instruction indicates said object is not to be compressed; and wherein said executing said compression handling instruction comprises storing said object in its original state into said data storage.

18. The computer implemented method of claim 17, further comprising:

setting a compression handling flag, wherein said flag indicates said object is not to be decompressed from its stored state when accessed; and storing said flag in association with said object.

19. The computer implemented method of claim 18, further comprising:

receiving a request to access said object from a requesting device at said storage controller; accessing said object;

determining a presence of said compression handling flag; and delivering said object to said requesting device without decompressing said object from its stored state when said flag is present.

20. The computer implemented method of claim 16, further comprising:

determining that said compression handling instruction was not received with said object; from its original state, compressing said object into a compressed state;

storing said object in said compressed state into said data storage;

receiving said compression handling instruction separate from said object, such that said instruction indicates said object is not to be compressed;

accessing said object in its compressed state;

decompressing said object into an uncompressed state;

setting a compression handling flag, wherein said flag indicates said object is not to be decompressed when accessed; and storing said object in said uncompressed state in said data storage.

* * * * *